United States Patent [19]

Faigle et al.

[11] Patent Number: 5,366,242
[45] Date of Patent: Nov. 22, 1994

[54] APPARATUS FOR CONTROLLING INFLATION OF AN AIR BAG

[75] Inventors: Ernst M. Faigle, Imlay City; John H. Semchena, Royal Oak; Richard J. Thompson, Imlay City; Charles E. Steffens, Jr., Washington, all of Mich.

[73] Assignee: TRW Vehicle Safety Systems Inc., Lyndhurst, Ohio

[21] Appl. No.: 145,808

[22] Filed: Nov. 1, 1993

[51] Int. Cl.$^5$ ............................................. B60R 21/26
[52] U.S. Cl. ................................ 280/736; 280/738; 280/739
[58] Field of Search ............... 280/736, 738, 739, 740

[56] References Cited

U.S. PATENT DOCUMENTS

| | | | |
|---|---|---|---|
| 3,801,126 | 4/1974 | Knight, IV et al. | 280/732 |
| 3,861,712 | 1/1975 | Matsui et al. | 280/735 |
| 3,884,499 | 5/1975 | Oka et al. | 280/735 |
| 3,888,508 | 6/1975 | Kizu et al. | 280/731 |
| 4,394,033 | 7/1983 | Goetz et al. | 280/736 |
| 5,016,913 | 5/1991 | Nakajima et al. | 280/738 |
| 5,257,818 | 11/1993 | Steffens, Jr. | 280/736 |

*Primary Examiner*—Kenneth R. Rice
*Attorney, Agent, or Firm*—Tarolli, Sundhheim & Covell

[57] ABSTRACT

An inflatable vehicle occupant restraint system comprises a source of inflation fluid (20) and an air bag reaction canister (24) having a vent opening (16) through which inflation fluid from the source of inflation fluid (20) may be vented away from the air bag canister (24). An air bag (12) is located in the air bag reaction canister (24) and is inflatable by inflation fluid from the source of inflation fluid (20). A valve member (30) is located on the air bag reaction canister (24). The valve member (30) is movable relative to the vent opening (16) in response to ambient temperature variations in the vicinity of the source of inflation fluid (20) to control venting of inflation fluid from the source of inflation fluid (20) through the vent opening (16). Inflation of the air bag (12) is thereby controlled in response to ambient temperature variations in the vicinity of the source of inflation fluid (20).

16 Claims, 5 Drawing Sheets

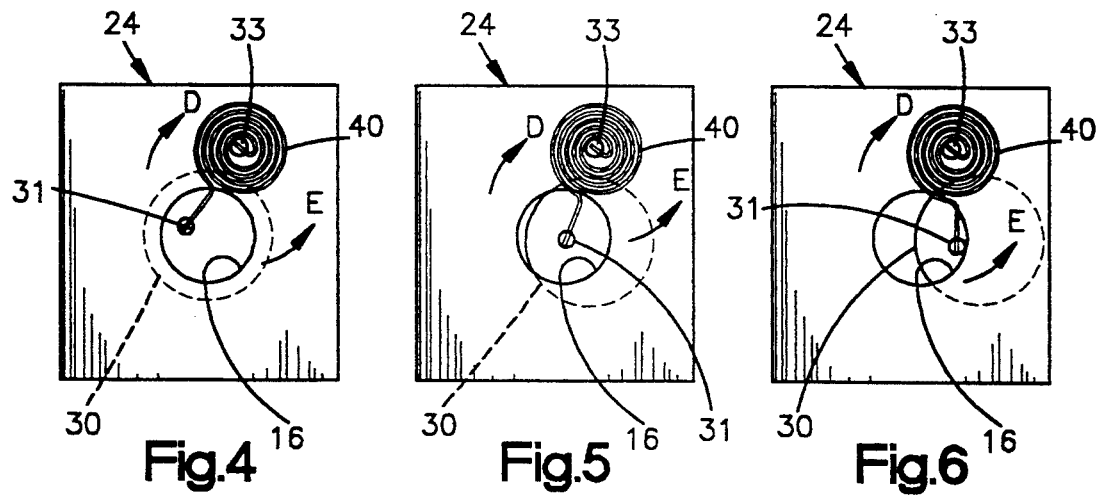
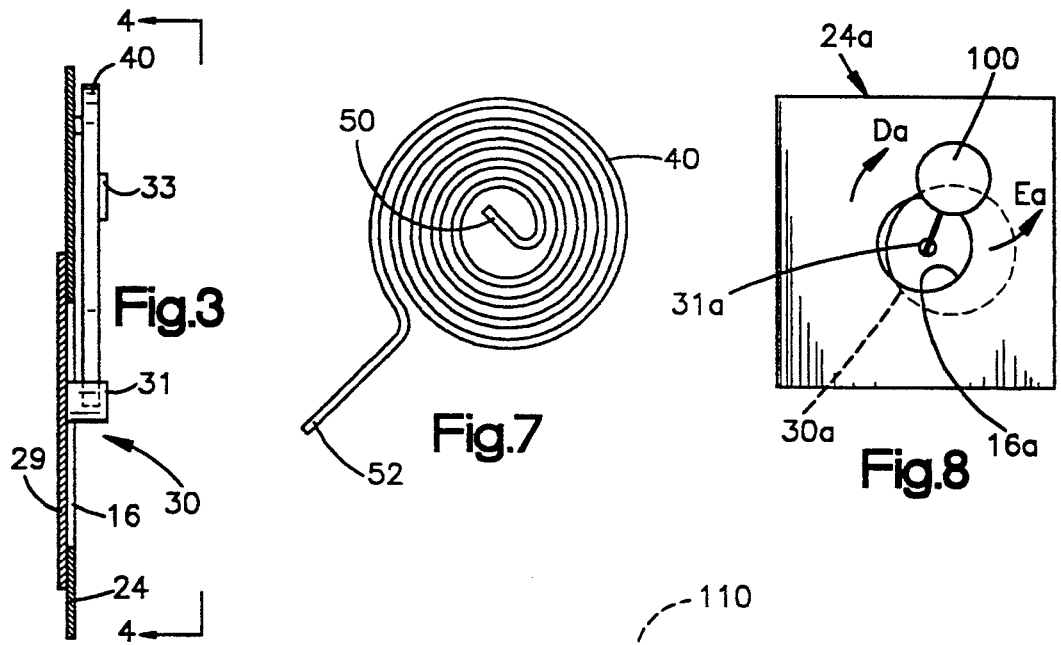
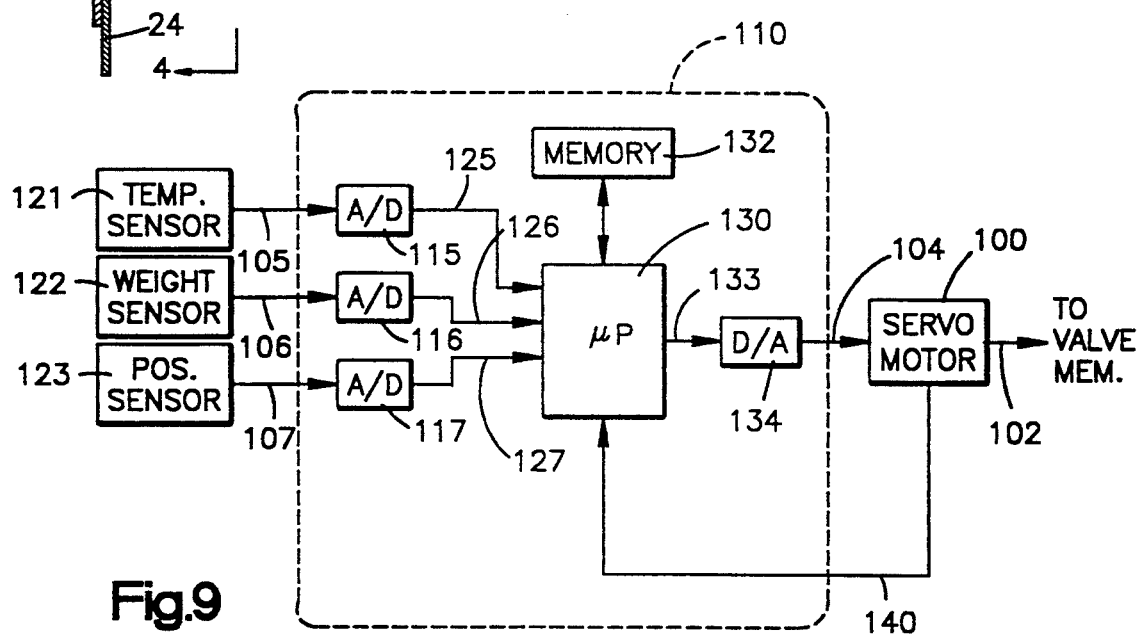

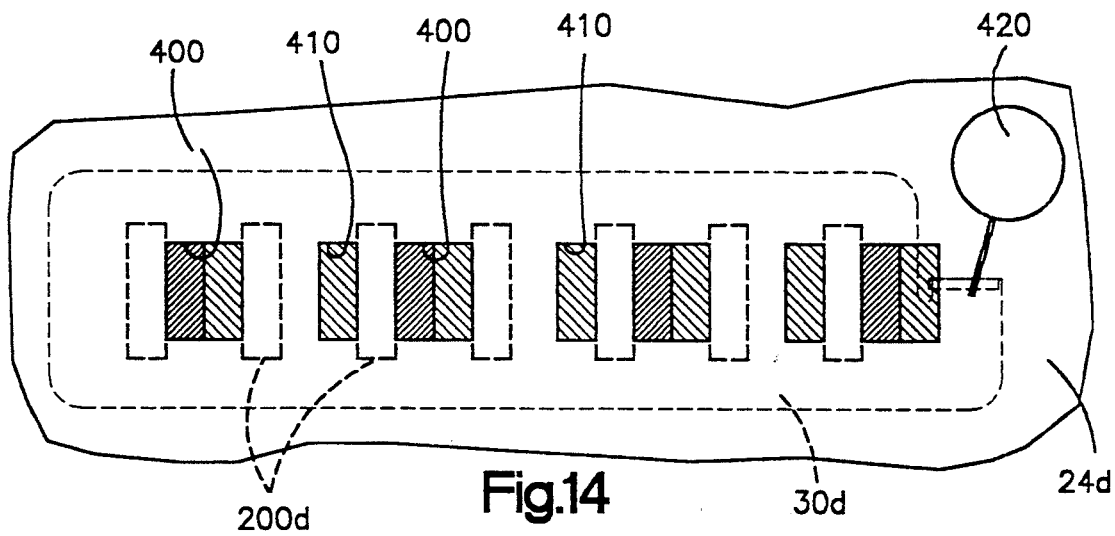
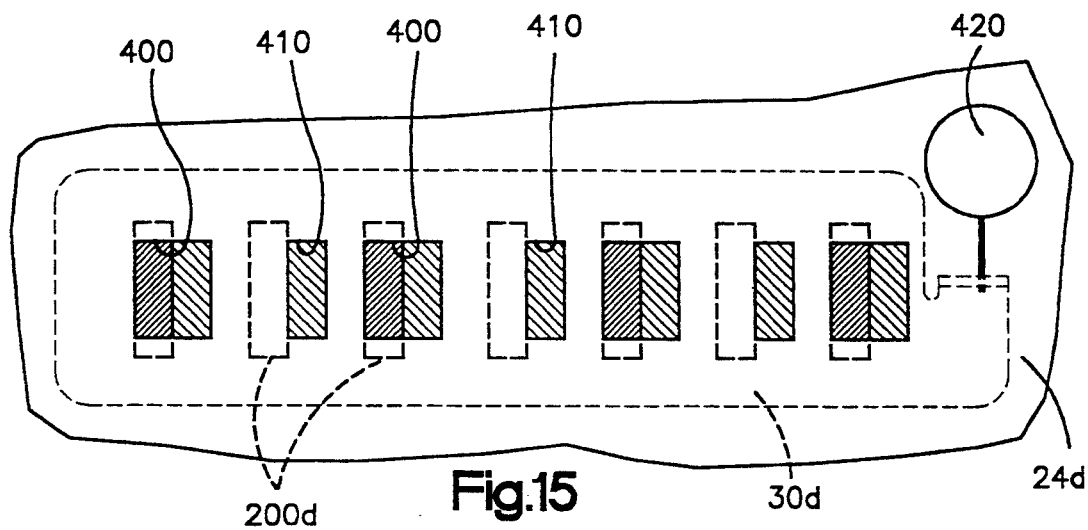
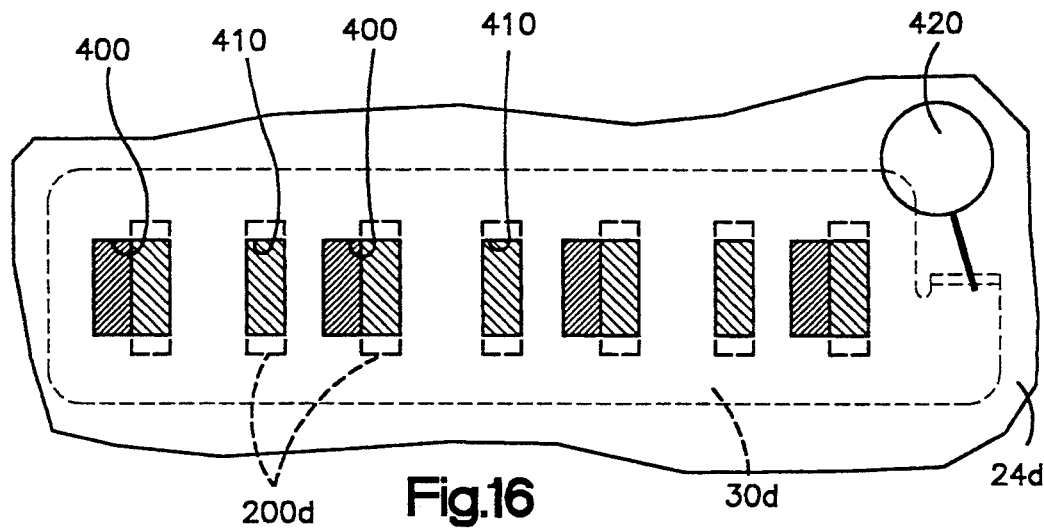

APPARATUS FOR CONTROLLING INFLATION OF AN AIR BAG

BACKGROUND OF THE INVENTION

1. Technical Field

The present invention relates to an inflatable vehicle occupant restraint system, and is particularly directed to an air bag assembly including a valve member on an air bag reaction canister for venting inflation fluid away from the reaction canister to control inflation of an air bag.

2. Background Art

A vehicle occupant restraint system having an inflatable air bag is known. Typically, an inflation fluid source such as a pyrotechnic gas generant, a stored gas supply, or a combination of the two, releases inflation fluid in response to a signal indicative of vehicle deceleration of at least a predetermined magnitude. The released inflation fluid is directed from the inflation fluid source into an inflatable air bag located in an air bag canister to inflate the air bag. In known vehicle occupant restraint systems, the released inflation fluid has a pressure which varies as a function of the ambient temperature in the vicinity of the inflation fluid source. This pressure variation occurs because the inflation fluid is sensitive to ambient temperature variations. Accordingly, the air bag tends to inflate faster when the ambient temperature is relatively high and to inflate slower when the ambient temperature is relatively low. Preferably, the air bag should inflate at the same rate over a wide ambient temperature range.

SUMMARY OF THE INVENTION

An inflatable vehicle occupant restraint system includes an inflatable air bag and an inflation fluid source for inflating the air bag. The air bag and the inflation fluid source are mounted on an air bag reaction canister. The air bag reaction canister has a vent opening. A valve member on the air bag reaction canister is associated with the vent opening. The valve member is movable relative to the vent opening to control venting of the inflation fluid and thereby control flow of inflation fluid into the air bag.

Means is provided for moving the valve member in response to ambient temperature variations in the vicinity of the inflation fluid source. The moving means (i) moves the valve member to increase blocking of inflation fluid flow through the vent opening when the ambient temperature in the vicinity of the inflation fluid source decreases, and (ii) moves the valve member to decrease blocking of inflation fluid flow through the vent opening when the ambient temperature in the vicinity of the inflation fluid source increases.

In a first embodiment of the present invention, the valve member is a plate, and the moving means includes a temperature-sensitive bimetallic spring which is operatively connected to the valve member to move the valve member in response to ambient temperature variations in the vicinity of the inflation fluid source.

In a second embodiment of the present invention, the valve member is a plate, and the moving means includes a servomotor operatively connected with the valve member. In the second embodiment, a controller controls operation of the servomotor in response to signals received from various sensors.

In a third embodiment of the present invention, the air bag reaction canister has at least one vent opening. The valve member also has at least one opening, which can be aligned with the at least one vent opening in the air bag reaction canister. The moving means includes a temperature-sensitive bimetallic spring which is operatively connected to the valve member to move the at least one opening in the valve member either more out of alignment or more into alignment with the at least one vent opening in the air bag reaction canister.

In a fourth embodiment of the present invention, the air bag reaction canister has at least one vent opening. The valve member also has at least one opening, which can be aligned with the at least one vent opening in the air bag reaction canister. The moving means includes a servomotor which is operatively connected to the valve member to move the at least one opening in the valve member either more out of alignment or more into alignment with the at least one vent opening in the air bag reaction canister. In the fourth embodiment, a controller controls operation of the servomotor in response to signals received from various sensors.

In a fifth embodiment of the present invention, the valve member has a plurality of openings and the air bag reaction canister has a plurality of vent openings. The moving means includes a three-position solenoid which is operatively connected to the valve member to move the plurality of openings in the valve member either more out of alignment or more into alignment with the plurality of vent openings in the air bag reaction canister.

BRIEF DESCRIPTION OF THE INVENTION

The foregoing and other features of the present invention will become apparent to one skilled in the art to which the present invention relates upon reading the following description of the invention with reference to the accompanying drawings, wherein:

FIG. 3 is an enlarged view, as viewed in the direction along line 3—3 in FIG. 2, showing a valve member used in the air bag canister;

FIG. 4 is a view taken approximately along line 4—4 in FIG. 3;

FIG. 5 is a view similar to FIG. 4 but showing the valve member in a different position;

FIG. 6 is a view similar to FIG. 5 but showing the valve member in another different position;

FIG. 7 is a plan view of a bimetallic spring used in the air bag canister of FIG. 2;

FIG. 8 is a view similar to FIG. 5 and showing a second embodiment of the present invention;

FIG. 9 is a schematic block diagram of a control circuit used in the second embodiment of FIG. 8;

FIG. 14 is a view similar to FIG. 13 and showing a fifth embodiment of the present invention;

FIG. 15 is a view similar to FIG. 14 but showing the valve member in a different position; and FIG. 16 is a view similar to FIG. 15 but showing the valve member in another different position.

DESCRIPTION OF THE PREFERRED EMBODIMENTS

Figure 1:
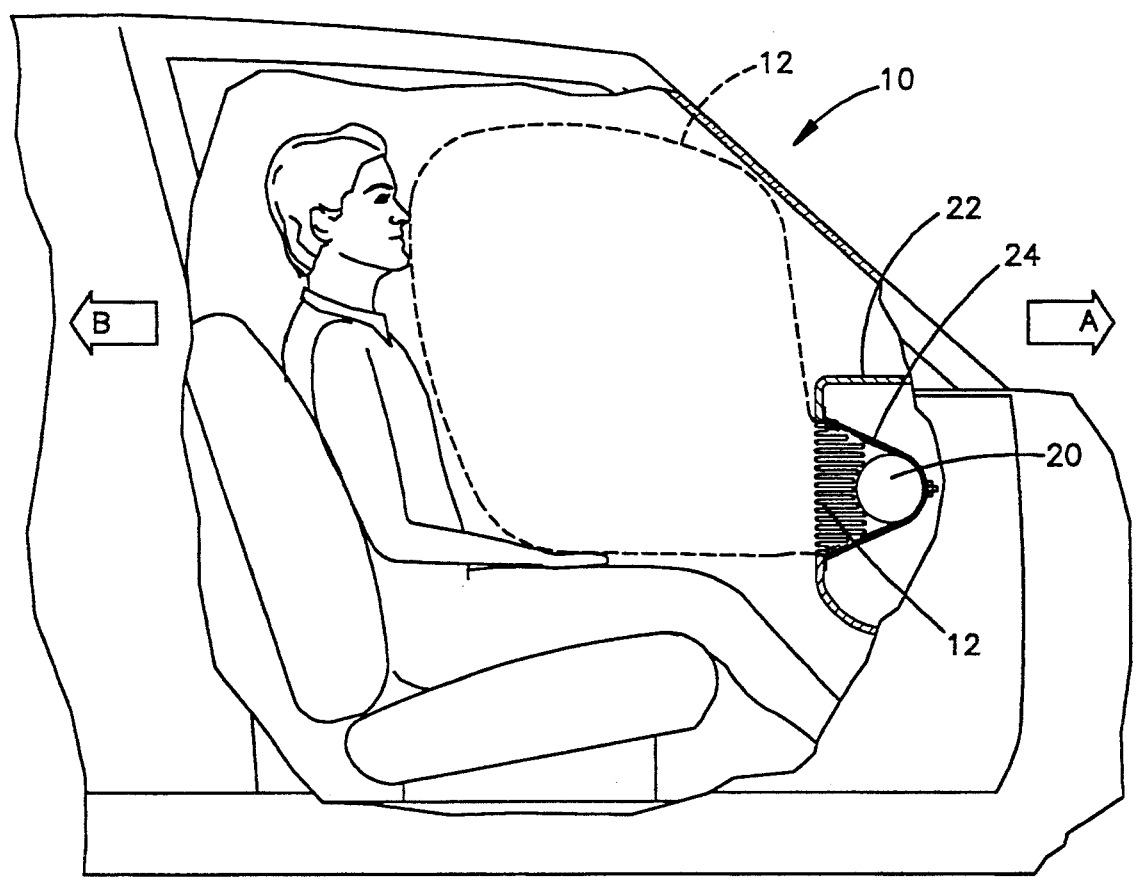
FIG. 1 is a schematic view of an inflatable occupant restraint system embodying an apparatus constructed in accordance with the present invention.

The present invention is directed to an apparatus for use in an inflatable vehicle occupant restraint system to vent an air bag reaction canister. The specific construction of the inflatable vehicle occupant restraint system may vary. By way of example, an inflatable vehicle occupant restraint system 10 embodying an apparatus constructed in accordance with the present invention is illustrated in FIG. 1. The vehicle occupant restraint system 10 is in a vehicle which has a forward direction indicated by an arrow A and a rearward direction indicated by an arrow B.

The vehicle occupant restraint system 10 includes an inflatable air bag 12. When the vehicle is involved in a collision, the air bag 12 is expanded from a collapsed condition, illustrated in solid lines in FIG. 1, to an expanded condition, illustrated in dashed lines in FIG. 1, by a rapid flow of gas from an inflation fluid source, such as an inflator 20. When the air bag 12 is in the expanded condition, it restrains movement of an occupant of the vehicle and prevents the occupant from violently striking parts of the vehicle interior during a collision. The air bag 12 then quickly collapses so that the occupant is free to exit from the vehicle. To permit the air bag 12 to collapse, the air bag 12 may be formed of a porous material or may have vents (not shown) which enable the gas to flow out of the air bag 12.

Although the air bag 12 could be mounted on many different parts of the vehicle, it is illustrated in FIG. 1 as mounted on a dashboard or instrument panel 22 of the vehicle. The air bag 12 is fixed to a rigid metal reaction canister 24 which is fixed to the dashboard 22. It is contemplated that the reaction canister 24 may be at a different location, such as in the vehicle door or in the steering wheel of the vehicle. The inflator 20 is oriented within the reaction canister 24 so that the flow of gas from the inflator 20 causes the air bag 12 to expand into the passenger compartment of the vehicle. The inflator 20 is actuated in response to a signal from a vehicle deceleration sensor (not shown) indicative of the occurrence of a vehicle collision.

Figure 2:
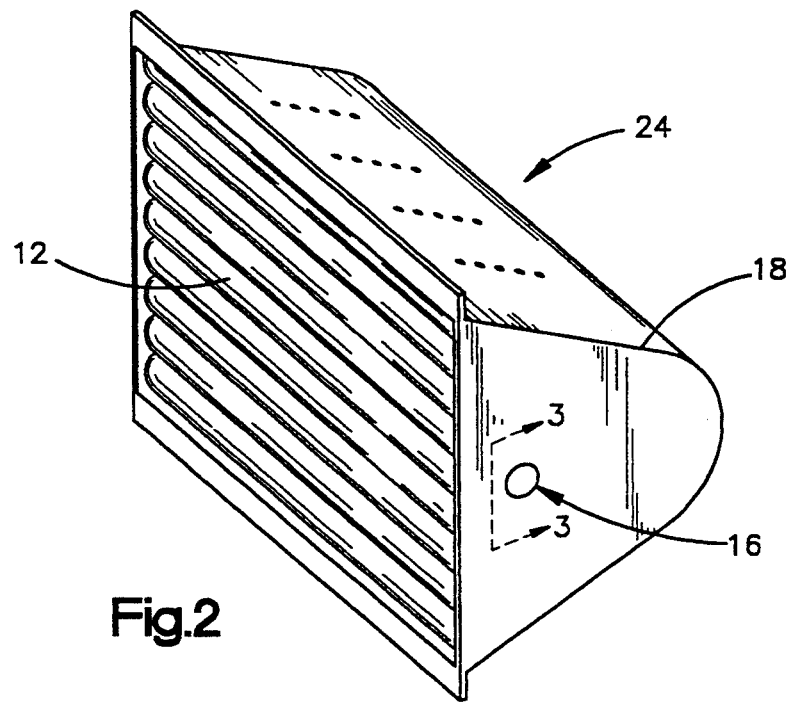
FIG. 2 is an enlarged perspective view of an air bag canister shown in FIG. 1.

Referring to FIG. 2, the reaction canister 24 has a circular vent opening 16 located on one side 18 of the reaction canister 24. Although only the one vent opening 16 is shown, there could be a number of other similar vent openings at different locations on the reaction canister 24. Also, the vent opening 16 could have a shape other than circular.

FIG. 3 illustrates the vent opening 16 looking in The direction along line 3—3 in FIG. 2. A fixed member 33 is attached to the outside of the reaction canister 24. A valve member 30 has a circular plate portion 29 and a circular stub portion 31 projecting from approximately the center of the plate portion 29. As shown in FIG. 3, the plate portion 29 is located inside of the reaction canister 24 and the stub portion 31 projects through the vent opening 16 to outside of the reaction canister 24. The valve member 30 and the fixed member 33 are each made of plastic material.

A temperature-sensitive bimetallic spring 40 is located outside of the reaction canister 24. The bimetallic spring 40 is operatively connected between the fixed member 33 and the stub portion 31 of the valve member 30. The bimetallic spring 40 is located in close proximity to the inflator 20. The ambient temperature in the vicinity of the bimetallic spring 40 is, therefore, essentially the same as the ambient temperature in the vicinity of the inflator 20.

The specific construction of the bimetallic spring 40 is best illustrated in FIG. 7. The spring 40 has a generally spiral shape. One end 50 of the spring 40 is located in the center of the spiral-shaped spring 40, and the other end 52 of the spring 40 is located along the periphery of the spiral-shaped spring 40, as shown in FIG. 7. The end 50 of the spring 40 is insert molded into the plastic material of the fixed member 33. The end 52 of the spring 40 is insert molded into the plastic material of the stub portion 31 of the valve member 30.

The valve member 30 is pivotable about the fixed member 33 in opposite directions indicated by arrows D and E. The plate portion 29 of the valve member 30 has a diameter which is slightly larger than the diameter of the vent opening 16. This enables the valve member 30 to be in a position in which the valve member 30 covers the vent opening 16 entirely, as shown in FIG. 4.

The valve member 30 is movable between a position, as shown in FIG. 4, in which the vent opening 16 is blocked entirely by the valve member 30 and another position, as shown in FIG. 6, in which the vent opening 16 is blocked the least possible amount by the valve member 30. The position of the valve member 30 shown in FIG. 5 is between the position of the valve member 30 shown in FIG. 4 and the position of the valve member 30 shown in FIG. 6. When the valve member 30 is in the position shown in FIG. 5, the vent opening 16 is blocked a predetermined amount by the valve member 30.

When the ambient temperature in the vicinity of the bimetallic spring 40 is at a typical, normal ambient temperature of about seventy-two degrees Fahrenheit (72° F.), the biasing force of the spring 40 acting on the valve member 30 is such that the valve member 30 is in the position shown in FIG. 5 in which the valve member 30 blocks the vent opening 16 the predetermined amount. When the ambient temperature in the vicinity of the bimetallic spring 40 increases from the normal ambient temperature, the bimetallic spring 40 contracts (coils) and thereby moves the valve member 30 from the position shown in FIG. 5 towards the position shown in FIG. 6 to decrease blocking of gas through the vent opening 16. As the ambient temperature in the vicinity of the spring 40 continues to increase, the valve member 30 continues to move toward the position shown in FIG. 6.

When the ambient temperature in the vicinity of the bimetallic spring 40 decreases from the normal ambient temperature, the bimetallic spring 40 expands (uncoils) and thereby moves the valve member 30 from the position shown in FIG. 5 towards the position shown in FIG. 4 to increase blocking of gas through the vent opening 16. As the ambient temperature in the vicinity of the spring 40 continues to decrease, the valve member 30 continues to move toward the position shown in FIG. 4.

As already mentioned, the ambient temperature in the vicinity of the inflator 20 is essentially the same as the ambient temperature in the vicinity of the spring 40. It should be apparent that the cooperation between the valve member 30 and the spring 40 is such that the valve member 30 (i) blocks the vent opening 16 the predetermined amount (as shown in FIG. 5) when the ambient temperature in the vicinity of the inflator 20 is at a typical, normal ambient temperature of about 72° F., (ii) blocks the vent opening 16 less than the predetermined amount (as shown in FIG. 6) when the ambient temperature in the vicinity of the inflator 20 is above the normal ambient temperature, and (iii) blocks the vent opening 16 more than the predetermined amount (as shown in FIG. 4) when the ambient temperature in the vicinity of the inflator 20 is below the normal ambient temperature. Thus, there is less blocking of gas through the vent opening 16 when the ambient temperature in the vicinity of the inflator 20 is higher than the normal ambient temperature, and more blocking of gas through the vent opening 16 when the ambient temperature in the vicinity of the inflator 20 is lower than the normal ambient temperature.

The position of the valve member 30 relative to the vent opening 16 controls the pressure in the reaction canister 24. The pressure in the reaction canister 24 is maintained substantially constant over a relatively wide ambient temperature range in the vicinity of the inflator 20 by the valve member 30. This occurs because the extent to which the vent opening 16 is blocked by the valve member 30 varies as a function of the ambient temperature in the vicinity of the inflator 20.

When the ambient temperature in the vicinity of the inflator 20 is relatively low, the vent opening 16 is blocked more than the predetermined amount. This allows more of the released gas from the inflator 20 to be directed to the air bag 12 to inflate the air bag 12. When the ambient temperature in the vicinity of the inflator 20 is relatively high, the vent opening 16 is blocked less than the predetermined amount. This allows excess gas in the reaction canister 24 to escape from the canister 24 to the passenger compartment or outside atmosphere. The pressure in the reaction canister 24 is maintained substantially constant over a relatively wide ambient temperature range in the vicinity of the inflator 20 by the valve member 30 moving to control venting of the gas. This enables the air bag 12 to be inflated at approximately the same rate over the relatively wide ambient temperature range.

Figure 10:
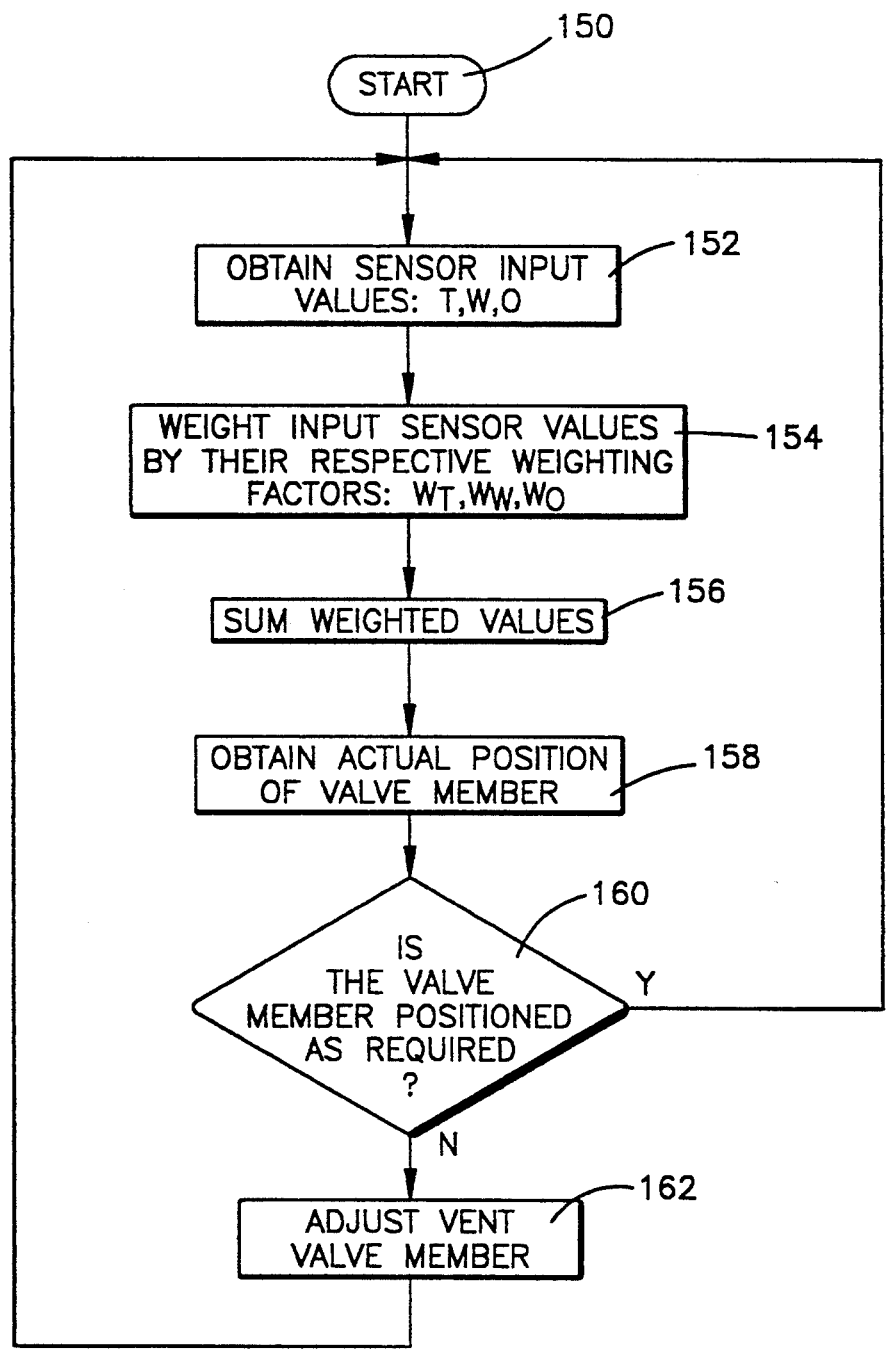
FIG. 10 is a flow chart depicting operation of the control circuit of FIG. 9.

A second embodiment of the present invention is illustrated in FIGS. 8–10. Since the embodiment of the invention illustrated in FIGS. 8–10 is generally similar to the embodiment of the invention illustrated in FIGS. 1–7, similar numerals are utilized to designate similar components, the suffix letter "a" being associated with the embodiment of FIGS. 8–10 to avoid confusion.

As shown in FIG. 8, a servomotor 100 is operatively connected with the stub portion 31a of the valve member 30a. The valve member 30a is located inside of the reaction canister 24a and the servomotor 100 is located outside of the reaction canister 24a. The servomotor 100 is controlled to move the valve member 30a between the position in which the valve member 30a blocks the vent opening 16a entirely and the position in which the valve member 30a blocks the vent opening 16a the least possible amount. The position of the valve member 30a shown in FIG. 8 is between the position which blocks the vent opening 16a entirely and the position which blocks the vent opening 16a the least possible amount. The position of the valve member 30a shown in FIG. 8 is the position in which the valve member 30a blocks the vent opening 16a a predetermined amount at the typical, normal ambient temperature of 72° F. The servomotor 100 is controlled in response to an output signal which varies as a function of a number of input signals.

Referring to FIG. 9, the servomotor 100 is mechanically coupled, as schematically shown by line 102, to control the valve member 30a in response to an analog signal on line 104 from a control circuit 110. The control circuit 110 provides the signal on line 104 in response to analog input signals on lines 105, 106, 107 from a temperature sensor 121, a weight sensor 122, and a position sensor 123. The temperature sensor 121 is located in the vicinity of the inflator (not shown in the embodiment of FIGS. 8–10) and provides the signal on line 105 which is indicative of the temperature in the vicinity of the inflator. The weight sensor 122 is located in the seat cushion of a vehicle seat (also not shown) and provides the signal on line 106 which is indicative of the weight of an occupant in the vehicle seat. The position sensor 123 is located along a track underneath the vehicle seat and provides the signal on line 107 which is indicative of the position of the vehicle seat along the forward and rearward directions of the vehicle.

Three analog-to-digital converters 115, 116, 117 convert the analog signals on lines 105, 106, 107 into corresponding digital signals on lines 125, 126, 127 respectively, in a manner that is known. A microprocessor 130 receives the signals on lines 125, 126, 127 and processes these signals in accordance with a program stored in a memory 132 which communicates with the microprocessor 130 to provide a digital output signal on line 133. Suitable microprocessors are readily available in the marketplace. Their structure and operation are well known and, therefore, will not be described. A digital-to-analog converter 134 converts the digital output signal on line 133 to provide a corresponding analog output signal on line 104 to control the servomotor 100.

Although not required, it is contemplated that the microprocessor 130 may also receive a feedback signal on line 140 from the servomotor 100 for providing closed-loop control of the servomotor 100. Alternatively, the microprocessor 130 may receive a feedback signal (not shown in FIG. 9) directly from the valve member 30a.

An example of a flow chart depicting operation of the servomotor 100 is illustrated in FIG. 10. The program begins in step 150 and proceeds to step 152 in which the values on lines 125, 126, 127 from the three sensors 121, 122, 123 are obtained. The program then proceeds to step 154 in which the values on lines 125, 126, 127 are weighted according to weighting factors $W_T$, $W_W$, $W_O$ stored in memory 132. The weighted values are then summed as shown in step 156.

After the weighted values are summed, the program proceeds to step 158 in which a signal indicative of the actual position of the valve member 30a is obtained. In step 160, a determination is made as to whether the valve member 30a is positioned as required. If the determination in step 160 is affirmative, the program returns to START in step 150. However, if the determination in step 160 is negative, the program proceeds to step 162 in which the signal on line 133 is provided to adjust the position of the valve member 30a before the program returns to START in step 150.

It should be apparent that the position to which the valve member 30a will move depends upon a combination of a number of factors. For example, if the ambient temperature in the vicinity of the inflator is relatively cold, or a relatively heavy occupant is in the vehicle seat, or the vehicle is travelling at a relatively high speed, and/or the seat is adjusted towards the rear of the vehicle, the valve member 30a will be positioned between the position in which the valve member 30a blocks the vent opening 16a the normal predetermined amount and the position in which the valve member 30a blocks the vent opening 16a entirely. Conversely, if the ambient temperature in the vicinity of the inflator is relatively hot, or a relatively light occupant is in the vehicle seat, or the vehicle is travelling at a relatively low speed, and/or the seat is adjusted towards the front of the vehicle, the valve member 30a will be positioned between the position in which the valve member 30a blocks the vent opening 16a the normal predetermined amount and the position in which the valve member 30a blocks the vent opening 16a the least possible amount.

Figure 11:
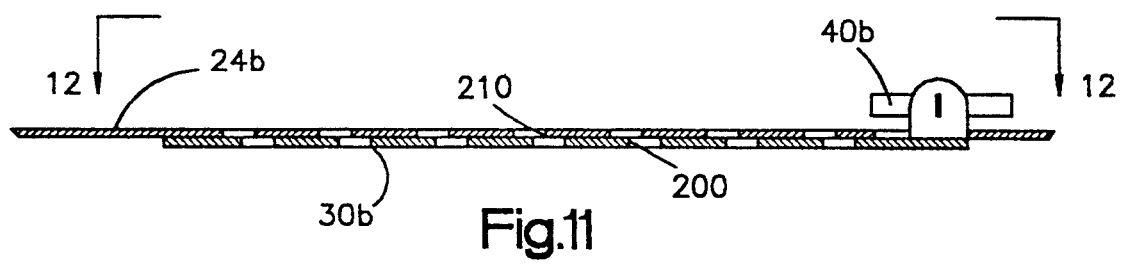
FIG. 11 is a view similar to FIG. 3 and showing a third embodiment of the present invention.
Figure 12:
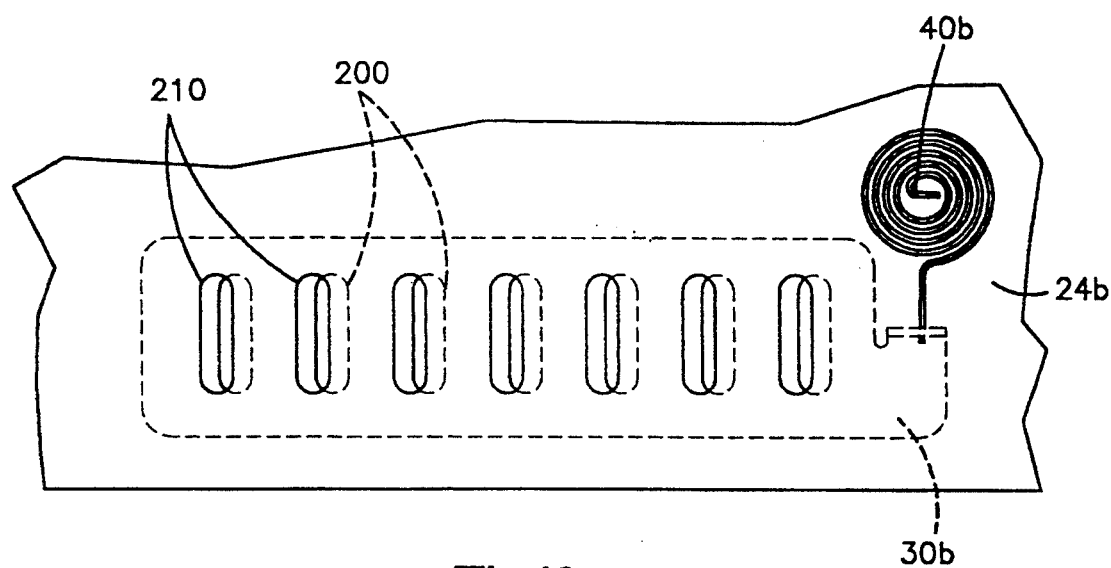
FIG. 12 is a view taken approximately along line 12—12 in FIG. 11.

A third embodiment of the present invention is illustrated in FIGS. 11 and 12. Since the embodiment of the invention illustrated in FIGS. 11 and 12 is generally similar to the embodiment illustrated in FIGS. 1–7, similar numerals are utilized to designate similar components, the suffix letter "b" being associated with the embodiment of FIGS. 11 and 12 to avoid confusion.

The reaction canister 24b has a plurality of oval-shaped openings 210 which are equally spaced apart as shown in FIG. 12. The valve member 30b has a generally rectangular shape and has a plurality of oval-shaped openings 200 which can be aligned with the plurality of openings 210 in the reaction canister 24b. The number of openings 200 in the valve member 30b is equal to the number of openings 210 in the reaction canister 24b. The valve member 30b is located inside of the reaction canister 24b and the bimetallic spring 40b is located outside of the reaction canister 24b.

The position of the valve member 30b shown in FIG. 12 is between the position in which the valve member 30b blocks the vent openings 210 entirely and the position in which the valve member 30b blocks the vent openings 210 the least possible amount. The position of the valve member 30b shown in FIG. 12 is the position in which the valve member 30b blocks the vent openings 210 the predetermined amount at the typical, normal ambient temperature of 72° F.

When the ambient temperature in the vicinity of the bimetallic spring 40b is at the typical, normal ambient temperature of 72° F., the biasing force of the spring 40b acting on the valve member 30b is such that the valve member 30b is in the position shown in FIG. 12 in which the valve member 30b blocks the vent openings 210 the predetermined amount. When the ambient temperature in the vicinity of the bimetallic spring 40b increases from the normal ambient temperature, the bimetallic spring 40b contracts (coils) to move the valve member 30b towards the left as viewed in FIG. 12. When the valve member 30b moves towards the left as viewed in FIG. 12, the valve member 30b blocks the vent openings 210 less than the predetermined amount shown in FIG. 12. When the ambient temperature in the vicinity of the bimetallic spring 40b decreases from the normal ambient temperature, the bimetallic spring 40b expands (uncoils) and moves towards the right as viewed in FIG. 12. When the valve member 30b moves towards the right as viewed in FIG. 12, the valve member 30b blocks the vent openings 210 more than the predetermined amount shown in FIG. 12. Thus, there is less blocking of gas through the vent openings 210 in the reaction canister 24b when the ambient temperature in the vicinity of the inflator (not shown in the embodiment of FIGS. 11 and 12) is higher than the normal ambient temperature, and more blocking of gas through the vent openings 210 in the reaction canister 24b when the ambient temperature in the vicinity of the inflator is lower than the normal ambient temperature.

Figure 13:
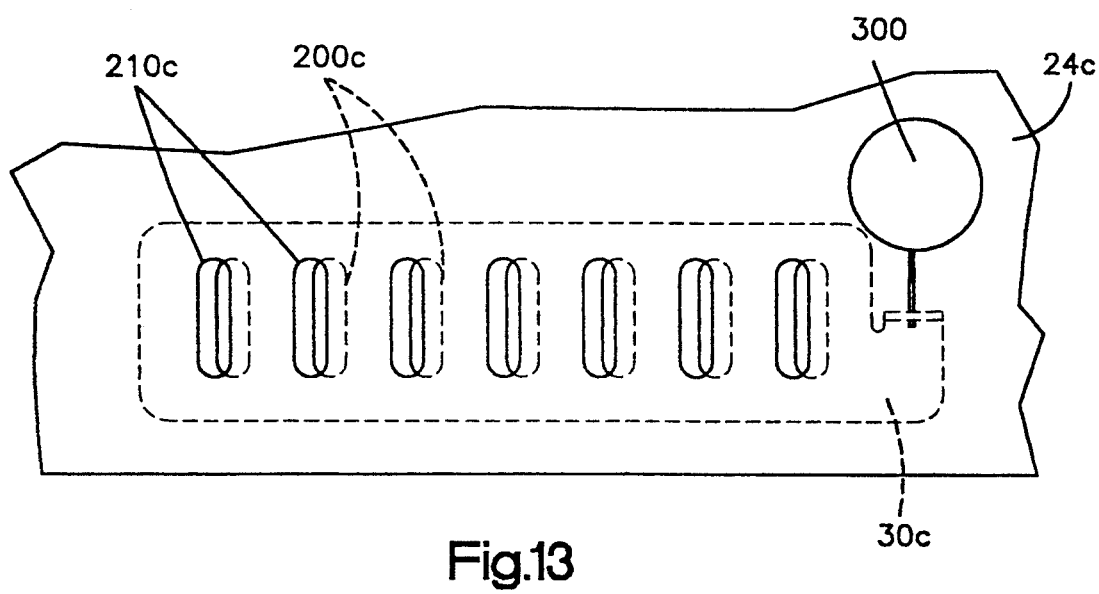
FIG. 13 is a view similar to FIG. 12 and showing a fourth embodiment of the present invention.

A fourth embodiment of the present invention is illustrated in FIG. 13. Since the embodiment of the invention illustrated in FIG. 13 is generally similar to the embodiment of the invention illustrated in FIGS. 11 and 12, similar numerals are utilized to designate similar components, the suffix letter "c" being associated with the embodiment of FIG. 13 to avoid confusion.

As shown in FIG. 13, a servomotor 300 is operatively connected with the valve member 30c. The valve member 30c is located inside of the reaction canister 24c and the servomotor 300 is located outside of the reaction canister 24c. The servomotor 300 is operable to move the openings 200c in the valve member 30c either more into alignment or more out of alignment with the vent openings 210c in the reaction canister 24c. The servomotor 300 is controlled to move the valve member 30c between the position in which the valve member 30c blocks the vent openings 210c in the reaction canister 24c entirely and the position in which the valve member 30c blocks the vent openings 210c the least possible amount. The servomotor 300 may be controlled using the same control procedure described hereinabove with respect to the embodiment illustrated in FIGS. 8–10.

A fifth embodiment of the present invention is illustrated in FIGS. 14–16. Since the embodiment of the invention illustrated in FIGS. 14–16 is generally similar to the embodiment of the invention illustrated in FIG. 13, similar numerals are utilized to designate similar components, the suffix letter "d" being associated with the embodiment of FIGS. 14–16 to avoid confusion.

As shown in FIG. 15, the reaction canister 24d has a first plurality of rectangular-shaped vent openings 400. The reaction canister 24d also has a second plurality of rectangular-shaped vent openings 410 which are located alternately between the first plurality of vent openings 400. The vent openings 400 are larger than the vent openings 410. The valve member 30d has the plurality of rectangular-shaped openings 200d which can be aligned with either the vent openings 400 or the vent openings 410 in the reaction canister 24d.

A three-position solenoid 420 is operatively connected with the valve member 30d. The valve member 30d is located inside of the reaction canister 24d and the solenoid 420 is located outside of the reaction canister 24d. The solenoid 420 is controlled to move the valve member 30d between the position in which the valve member 30d blocks the vent openings 400, 410 in the reaction canister 24d entirely and the position in which the valve member 30d blocks the vent openings 400, 410 the least possible amount.

When the ambient temperature in the vicinity of the inflator (not shown in the embodiment of FIGS. 14–16) is at the typical, normal ambient temperature of 72° F., the openings 200d in the valve member 30d are aligned relative to the vent openings 400, 410 in the reaction canister 24d in a manner as shown in FIG. 15. More specifically, only some of the openings 200d in the valve member 30d are aligned with the left portion of the vent openings 400 in the reaction canister 24d. The remaining ones of the openings 200d in the valve member 30d are not aligned with either the vent openings 400 or the vent openings 410 in the reaction canister 24d.

When the ambient temperature in the vicinity of the inflator increases from the normal ambient temperature of 72° F., the solenoid 420 is actuated to move the valve member 30d from the position shown in FIG. 15 to the position shown in FIG. 16 to decrease the overall total amount of blocking of gas through the vent openings 400 and the vent openings 410 in the reaction canister 24d. The overall total amount of blocking of gas is less in FIG. 16 because all of the openings 200d in the valve member 30d are aligned with either the vent openings 400 or the vent openings 410 in the reaction canister 24d. When the ambient temperature in the vicinity of the inflator decreases from the normal ambient temperature of 72° F., the solenoid 420 is actuated to move the valve member 30d from the position shown in FIG. 15 to the position shown in FIG. 14 to increase the overall total amount of blocking of gas through the vent openings 400 and the vent openings 410 in the reaction canister 24d. The overall total amount of blocking of gas is more in FIG. 14 because none of the openings 200d in the valve member 30d are aligned with either the vent openings 400 or the vent openings 410 in the reaction canister 24d. Thus, there is less overall total amount of blocking of gas through the vent openings 400 and the vent openings 410 in the reaction canister 24d when the ambient temperature in the vicinity of the inflator is higher than the normal ambient temperature. There is more overall total amount of blocking of gas through the vent openings 400 and the vent openings 410 in the reaction canister 24d when the ambient temperature in the vicinity of the inflator is lower than the normal ambient temperature.

From the above description of the invention, those skilled in the art of the present invention will perceive improvements, changes and modifications. Such improvements, changes and modifications within the skill of the art of the present invention are intended to be covered by the appended claims.

Having described the invention, the following is claimed:

1. An inflatable vehicle occupant restraint system comprising:
    an inflatable air bag having fabric panels defining an interior cheer into which inflation fluid flows to inflate said air bag;
    an air bag reaction canister having walls defining a storage chamber in which said air bag is stored, said reaction canister having a vent opening in at least one of said walls;
    a source of inflation fluid for inflating said air bag;
    a valve member mounted on one of said walls of said air bag reaction canister, said valve member being movable relative to said vent opening to control flow of inflation fluid through said vent opening; and
    means for moving said valve member relative to said vent opening in response to ambient temperature variations in the vicinity of said source of inflation fluid.

2. An inflatable vehicle occupant restraint system according to claim 1 wherein said valve member has a position relative to said vent opening in which said valve member blocks said vent opening a predetermined amount, said means for moving said valve member being operable to (i) move said valve member in one direction to increase blocking of said vent opening in response to decreasing ambient temperature and (ii) move said valve member in a direction opposite the one direction to decrease blocking of said vent opening in response to increasing ambient temperature.

3. An inflatable vehicle occupant restraint system according to claim 1 wherein said air bag reaction canister has a plurality of vent openings.

4. An apparatus comprising:
    a source of inflation fluid;
    an air bag reaction canister having a vent opening through which inflation fluid from said source of inflation fluid may be vented from said air bag reaction canister;
    an air bag located in said air bag reaction canister and inflatable by inflation fluid from said source of inflation fluid;
    a valve member for blocking the vent opening in said air bag reaction canister, said valve member being movable from a predetermined position in which said vent opening is unblocked a predetermined amount and another position in which said valve member blocks the vent opening an amount more than said predetermined amount; and
    means for moving said valve member relative to said vent opening in response to ambient temperature variations in the vicinity of said source of inflation fluid to control venting of inflation fluid from said source of inflation fluid through said vent opening and thereby to control inflation of said air bag when said air bag is inflated by inflation fluid from said source of inflation fluid.

5. An inflatable vehicle occupant restraint system comprising:
    an inflatable air bag;
    an air bag reaction canister in which said air bag is stored, said reaction canister having a vent opening;
    a source of inflation fluid for inflating said air bag;
    a valve member on said air bag reaction canister, said valve member being movable relative to said vent opening to control flow of inflation fluid through said vent opening; and
    means for moving said valve member relative to said vent opening in response to ambient temperature variations in the vicinity of said source of inflation fluid, said means for moving said valve member including a servomotor operatively connected with said valve member for (i) moving said valve member to increase blocking of gas flow through said vent opening when the ambient temperature in the vicinity of said source of inflation fluid decreases, and (ii) moving said valve member to decrease blocking of gas flow through said vent opening when the ambient temperature in the vicinity of said source of inflation fluid increases.

6. An inflatable vehicle occupant restraint system according to claim 5 further including controller means for controlling operation of said servomotor to move said valve member between different positions relative to said vent opening.

7. An inflatable vehicle occupant restraint system according to claim 6 further including means responsive to the weight of an occupant seated in a vehicle seat and for providing a signal associated with the weight of the occupant, said controller means monitoring said signal and controlling movement of said valve member relative to said vent opening in response to variations in said signal.

8. An inflatable vehicle occupant restraint system according to claim 6 further including position sensor means responsive to the position of a vehicle seat and for providing a signal associated with the position of the vehicle seat, said controller means monitoring said signal and controlling movement of said valve member relative to said vent opening in response to variations in said signal.

9. An inflatable vehicle occupant restraint system comprising:
an inflatable air bag;
an air bag reaction canister in which said air bag is stored, said reaction canister having a vent opening;
a source of inflation fluid for inflating said air bag;
a valve member on said air bag reaction canister, said valve member having an opening which can be aligned with said vent opening in said air bag reaction canister, said valve member being movable between a first position in which said opening in said valve member is nonaligned with said vent opening in said air bag reaction canister to block flow of inflation fluid through said vent opening in said air bag reaction canister and a second position in which said opening in said valve member is aligned with said vent opening in said air bag reaction canister to allow flow of inflation fluid through said vent opening in said air bag reaction canister, said valve member being movable relative to said vent opening to control flow of inflation fluid through said vent opening; and
means for moving said valve member relative to said vent opening in response to ambient temperature variations in the vicinity of said source of inflation fluid.

10. An inflatable vehicle occupant restraint system according to claim 9 wherein said means for moving said valve member includes a temperature-sensitive bimetallic spring operatively connected with said valve member for (i) moving said valve member to increase blocking of gas flow through said vent opening when the ambient temperature in the vicinity of said source of inflation fluid decreases, and (ii) moving said valve member to decrease blocking of gas flow through said vent opening when the ambient temperature in the vicinity of said source of inflation fluid increases.

11. An inflatable vehicle occupant restraint system according to claim 9 wherein said means for moving said valve member includes a servomotor operatively connected with said valve member for (i) moving said valve member to increase blocking of gas flow through said vent opening when the ambient temperature in the vicinity of said source of inflation fluid decreases, and (ii) moving said valve member to decrease blocking of gas flow through said vent opening when the ambient temperature in the vicinity of said source of inflation fluid increases.

12. An inflatable vehicle occupant restraint system according to claim 11 further including controller means for controlling operation of said servomotor to move said valve member between different positions relative to said vent opening.

13. An inflatable vehicle occupant restraint system comprising:
an inflatable air bag;
an air bag reaction canister in which said air bag is stored, said reaction canister having a vent opening;
a source of inflation fluid for inflating said air bag;
a valve member on said air bag reaction canister, said valve member being a plate which moves relative to said vent opening, said valve member being movable relative to said vent opening to control flow of inflation fluid through said vent opening; and
means for moving said valve member relative to said vent opening in response to ambient temperature variations in the vicinity of said source of inflation fluid.

14. An inflatable vehicle occupant restraint system comprising:
an inflatable air bag;
an air bag reaction canister in which said air bag is stored, said valve member having a plurality of openings which can be aligned with said vent openings in said air bag reaction canister, said valve member being in a predetermined position in which only certain of said plurality of openings in said valve member are aligned with only certain of said vent openings in said air bag reaction canister to allow flow of inflation fluid therethrough, said valve member being movable from said predetermined position to a first position in which fewer than said certain of said plurality of openings in said valve member are aligned with fewer than said certain of said vent openings in said air bag reaction canister to allow relatively less inflation fluid to flow therethrough, said valve member being movable between said predetermined position and a second position in which more than said certain of said plurality of openings in said valve member are aligned with more than said certain of said vent openings in said air bag reaction canister to allow relatively more inflation fluid to flow therethrough;
a source of inflation fluid for inflating said air bag;
a valve member on said air bag reaction canister, said valve member being movable relative to said vent opening to control flow of inflation fluid through said vent opening; and
means for moving said valve member relative to said vent opening in response to ambient temperature variations in the vicinity of said source of inflation fluid.

15. An inflatable vehicle occupant restraint system according to claim 14 wherein said means for moving said valve member includes a three-position solenoid operatively connected with said valve member in which said first position of said valve member is associated with a first position of said solenoid, said second position of said valve member is associated with a second position of said solenoid, and said predetermined position of said valve member is associated with a third position of said solenoid.

16. An inflatable vehicle occupant restraint system comprising:
an inflatable air bag;
an air bag reaction canister in which said air bag is stored, said reaction canister having a vent opening;
a source of inflation fluid for inflating said air bag;
a valve member on said air bag reaction canister, said valve member being movable relative to said vent opening to control flow of inflation fluid through said vent opening; and
means for moving said valve member relative to said vent opening in response to ambient temperature variations in the vicinity of said source of inflation fluid, said means for moving said valve member including a temperature-sensitive bimetallic spring operatively connected with said valve member for (i) moving said valve member to increase blocking of gas flow through said vent opening when the ambient temperature in the vicinity of said source of inflation fluid decreases, and (ii) moving said valve member to decrease blocking of gas flow through said vent opening when the ambient temperature in the vicinity of said source of inflation fluid increases.

* * * * *